M. J. B. BARBAROU.
PISTON ROD CONNECTION FOR EXPLOSION ENGINES.
APPLICATION FILED APR. 7, 1916.
1,315,653. Patented Sept. 9, 1919.
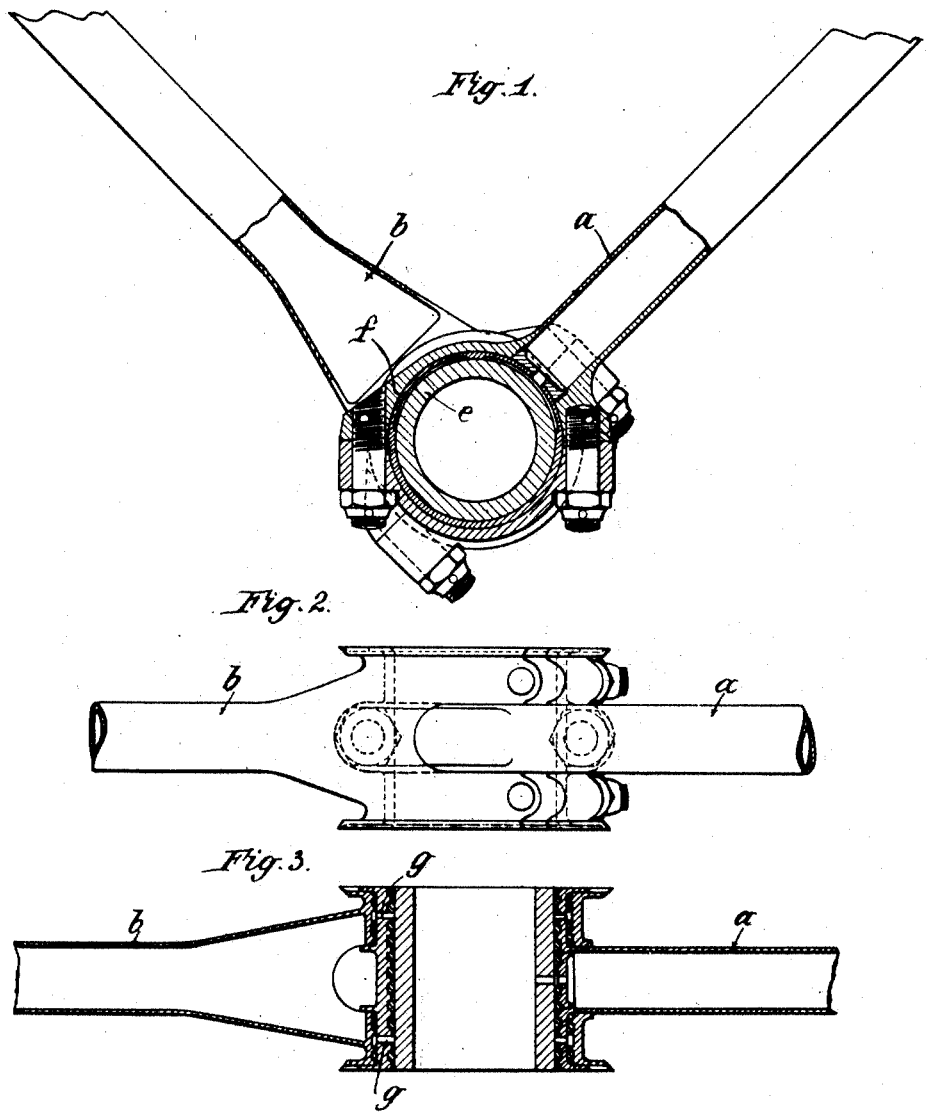

UNITED STATES PATENT OFFICE.

MARIUS JEAN BAPTISTE BARBAROU, OF NEUILLY-SUR-SEINE, FRANCE.

PISTON-ROD CONNECTION FOR EXPLOSION-ENGINES.

1,315,653.      Specification of Letters Patent.      Patented Sept. 9, 1919.

Application filed April 7, 1916. Serial No. 89,568.

*To all whom it may concern:*

Be it known that I, MARIUS JEAN BAPTISTE BARBAROU, citizen of the Republic of France, residing at 24 Rue St. James, Neuilly-sur-Seine, Seine, in the Republic of France, have invented new and useful Improvements in Piston-Rod Connections for Explosion-Engines, of which the following is a specification.

In the case of motors in which the cylinders are disposed on each side of a common axis, and especially as concerns 8-cylinder motors in which the axes of the cylinders converge toward the center of the shaft and are situated 90 degree apart, the great difficulty lies in the proper mounting of the piston rods upon the single crank pin of the shaft.

The present invention has for its object an improved method of mounting the piston rods in motors of this class.

The accompanying drawing represents this method of mounting, in which:

Figure 1 is a vertical section, perpendicular to the motor shaft.

Fig. 2 is a corresponding plan view.

Fig. 3 is a section through the shaft.

Referring to the drawing, it will be noticed that the secondary piston rod $b$ turns about the principal piston rod $a$ and that it has a very small displacement with relation to the said piston rod $a$, so that the amount of friction is much lessened, and this together with the large surface given by this arrangement to the secondary piston rod, reduces the amount of wear to a minimum; as regards the principal piston rod $a$, it works directly upon the shaft in the same manner as in the case of a motor having a single row of cylinders.

The two bearings of the secondary piston rod $b$, which is of the forked type, are formed of the steel portion of the piston rod itself, into which is cast antifriction metal; the bearing part is connected to the rod proper by the use of a conical portion, the junction being made on the arc of a circle.

This method of mounting allows the piston rods to be made of very great strength and having at the same time a very light weight.

Oiling of the two piston rods is carried out in the best manner, the main piston rod can receive oil coming directly from the shaft by the opening $e$; this oil runs in the groove $f$ of the said piston rod, and by the use of the properly disposed openings $g$ it can be brought between the main piston rod and the two bearings of the secondary piston rod.

As on the other hand the secondary piston rod requires a much less amount of lubrication than the main piston rod, the use of the present arrangement with the proper length given to the oiling grooves, allows of supplying the required amount of oil both to the main piston rod and to the secondary or twin piston rod.

Having now described my invention, what I claim as new and desire to secure by Letters Patent is;

1. In a piston rod connection for explosion engines, the combination with a crank pin, of a main connecting rod having a head comprising a unitary cap projecting from opposite sides of the connecting rod and embracing said crank pin, and an auxiliary connecting rod having a head comprising a bifurcated cap embracing and making direct contact with the cap of the main connecting rod at either side of the latter.

2. In a piston rod connection for explosion engines, the combination of a crank pin, a main connecting rod having its body in one piece and a head integral with the said body and provided with a cap, the head and its cap directly embracing the crank pin, and a secondary connecting rod, having its body in one piece and a forked head which is integral with said body and provided with detachable caps, said forked head directly embracing the head of the main connecting rod on both sides of the body thereof, the body of the secondary connecting rod being a hollow tubular piece and being connected to the forked head by a hollow conical part, substantially as described and for the purpose set forth.

In testimony whereof I have signed my name to this specification in the presence of two subscribing witnesses.

MARIUS JEAN BAPTISTE BARBAROU.

Witnesses:
ANTOINE LAVOIX,
CHAS. P. PRESSLY.